(12) United States Patent
Giaever et al.

(10) Patent No.: US 11,273,977 B2
(45) Date of Patent: Mar. 15, 2022

(54) WASTE BIN AND METHOD OF SORTING WASTE PAPER PRODUCTS FROM OTHER TYPES OF WASTE IN A WASTE BIN

(71) Applicant: Essity Hygiene and Health Aktiebolag, Gothenburg (SE)

(72) Inventors: Stig Giaever, Partille (SE); Patrick Nilsson, Partille (SE); Lars Ake Johansson, Partille (SE); Johan Rubensson, Partille (SE); Krisztian Schaffer, Komarom-Esztergom megye (HU)

(73) Assignee: Essity Hygiene and Health Aktiebolag, Gothenburg (SE)

(*) Notice: Subject to any disclaimer, the term of this patent is extended or adjusted under 35 U.S.C. 154(b) by 330 days.

(21) Appl. No.: 16/615,247

(22) PCT Filed: Jul. 6, 2017

(86) PCT No.: PCT/EP2017/067010
§ 371 (c)(1),
(2) Date: Nov. 20, 2019

(87) PCT Pub. No.: WO2019/007518
PCT Pub. Date: Jan. 10, 2019

(65) Prior Publication Data
US 2020/0165063 A1 May 28, 2020

(51) Int. Cl.
*B65F 1/00* (2006.01)
*B65F 1/14* (2006.01)

(52) U.S. Cl.
CPC .......... *B65F 1/0033* (2013.01); *B65F 1/1405* (2013.01); *B65F 2001/008* (2013.01);
(Continued)

(58) Field of Classification Search
CPC ........ B65F 1/0033; B65F 1/1405; B65F 1/10; B65F 2001/008; B65F 2210/152;
(Continued)

(56) References Cited

U.S. PATENT DOCUMENTS

2016/0078414 A1* 3/2016 Rathore ............... G06K 9/6255
705/308
2018/0016096 A1* 1/2018 Krishnamurthy ......... B65F 1/14

FOREIGN PATENT DOCUMENTS

CN 105730930 A * 7/2016
DE 297 21 542 U1 6/1998
(Continued)

OTHER PUBLICATIONS

European Patent Office, International Search Report and Written Opinion of the International Searching Authority, International Application No. PCT/EP2017/067010, dated Mar. 6, 2018 (14 pages).

*Primary Examiner* — Gene O Crawford
*Assistant Examiner* — Muhammad Awais
(74) *Attorney, Agent, or Firm* — Wood Herron & Evans LLP

(57) ABSTRACT

A waste bin comprises a sorting space for sorting waste paper products from other types of waste, a movable separation element comprising a plurality of openings, a physical property sensing mechanism for detecting a physical property of waste received in the sorting space, a removal element for moving waste from the sorting space to a waste paper product compartment, and a control for controlling the movable separation element and the removal element. The movable separation element is configured to move upon the application of an external force exceeding a threshold value. The control is configured to operate the removal element or the movable separation element, based on a detection result of the physical property sensing mechanism. Further, a (Continued)

method of sorting waste paper products from other types of waste in such a waste bin is provided.

25 Claims, 2 Drawing Sheets

(52) U.S. Cl.
CPC ... *B65F 2210/152* (2013.01); *B65F 2210/162* (2013.01); *B65F 2210/168* (2013.01); *B65F 2210/176* (2013.01); *B65F 2240/1566* (2013.01); *B65F 2240/1568* (2013.01)

(58) Field of Classification Search
CPC ...... B65F 2210/1522; B65F 2210/1527; B65F 2210/162; B65F 2210/168; B65F 2210/176; B65F 2240/1566; B65F 2240/1568; B65F 2240/164; B65F 2240/168; B65F 2240/1123; B65F 2240/1126; B65F 2240/12; Y02W 30/60; Y02W 30/62; Y02W 30/64; B07C 5/04; B07C 5/08; B07C 5/083; B07C 5/10; B07C 5/16; B07C 5/18; B07C 5/20; B07C 5/34; B07C 5/342; B07C 5/3422
USPC .......................................................... 209/930
See application file for complete search history.

(56) References Cited

FOREIGN PATENT DOCUMENTS

| EP | 2 253 564 A1 | 11/2010 | | |
|---|---|---|---|---|
| FR | 2 812 624 A1 | 2/2002 | | |
| FR | 2812624 A1 | * | 2/2002 | ............ B65F 1/1623 |
| KR | 20140087286 A | * | 7/2014 | |
| WO | 2015015338 A2 | 2/2015 | | |

* cited by examiner

WASTE BIN AND METHOD OF SORTING WASTE PAPER PRODUCTS FROM OTHER TYPES OF WASTE IN A WASTE BIN

CROSS-REFERENCE TO RELATED APPLICATION

The present application is a U.S. national stage entry under 35 U.S.C. § 371 of, and claims priority to, International Application No. PCT/EP2017/067010, filed Jul. 6, 2017, the disclosure of which is hereby incorporated herein by reference in its entirety.

FIELD OF THE INVENTION

The present invention relates to a waste bin for waste paper products, such as waste paper sheet products, e.g., paper towels, and other types of waste. Further, the present invention relates to a method of sorting waste paper products, such as waste paper sheet products, e.g., paper towels, from other types of waste in a waste bin.

BACKGROUND OF THE INVENTION

Waste bins are commonly used in public areas, such as public bathrooms, public toilets, airports, train stations, petrol stations, restaurants, etc., to collect waste. Often, such waste bins are intended for receiving different types of waste, e.g., paper waste, such as papers towels, tissues, paper cups or the like, plastic waste, such as plastic cups, plastic packaging material, plastic bags, plastic bottles or the like, food waste and other types of waste.

Some of the waste material to be collected in waste bins in public areas, e.g., some types of paper waste and plastic waste, is recyclable. In order to facilitate separation of such material from other, non-recyclable waste material and thus render the recycling process easier and more efficient, some waste bins comprise separate compartments for receiving and storing different types of waste. For example, a waste bin may have a first compartment for paper waste and a second compartment for other types of waste, each compartment having a corresponding deposit opening. Users of such waste bins are supposed to deposit their waste according to instructions given on the bin.

However, this "manual" waste separation frequently yields unsatisfactory results. Users of waste bins in public areas are often in stress situations, for example, rushing to catch a train or a plane, or simply careless, thus depositing their waste in the wrong compartment. Further, the language barrier may cause confusion with regard to the appropriate compartment to be used. This latter aspect applies, in particular, to waste bins at train stations and airports, e.g., in public train station or airport bathrooms or toilets, where commonly numerous people of different nationalities are present.

Already a comparatively small amount of incorrectly deposited waste material may render reliable waste separation in such waste bins inefficient or even entirely unfeasible.

FR 2 812 624 A1 discloses a waste bin with two waste compartments and a movable, spring-loaded lid which is inclined with respect to the horizontal plane. If sufficiently heavy waste is dropped onto the lid, the lid is pushed open and the waste falls into the first waste compartment. If the waste does not have sufficient weight to open the lid, e.g., for the case of a waste plastic bottle, the waste slides down the inclined lid and falls into the second waste compartment.

However, the waste bin disclosed in FR 2 812 624 A1 only allows for a coarse separation of waste by weight and is thus not suitable for reliably and efficiently sorting waste material. In particular, this waste bin cannot be used for separating waste paper products, such as waste paper sheet products, e.g., paper towels or tissues, from other types of waste.

Hence, there exists a need for a waste bin which allows for waste paper products to be sorted from other types of waste in an efficient and reliable manner. Further, there is a need for a method which enables efficient and reliable sorting of waste paper products from other types of waste in a waste bin.

SUMMARY OF THE INVENTION

Accordingly, it is desired to provide a waste bin which allows for waste paper products to be sorted from other types of waste in an efficient and reliable manner. This object can be achieved by a waste bin with the technical features given in the following.

The waste bin is a waste bin for waste paper products and other types of waste. The waste bin comprises at least one deposit opening for depositing waste into an interior of the waste bin and a sorting space for sorting waste paper products from other types of waste. The at least one deposit opening is in communication with the sorting space. The waste bin further comprises a waste paper product compartment for receiving and storing waste paper products, a waste compartment for receiving and storing other types of waste, a movable separation element separating the sorting space from the waste compartment, a physical property sensing mechanism for detecting a physical property of waste received in the sorting space, a removal element for moving waste from the sorting space to the waste paper product compartment, and a control for controlling the movable separation element and the removal element. The movable separation element comprises a plurality of openings, providing indirect communication between the sorting space and the waste compartment through the movable separation element. The movable separation element is configured to move upon the application of an external force exceeding a threshold value, thereby establishing direct communication between the sorting space and the waste compartment. The control is configured to operate the removal element so as to move waste from the sorting space to the waste paper product compartment or to operate the movable separation element so as to establish direct communication between the sorting space and the waste compartment, based on a detection result of the physical property sensing mechanism.

The waste bin is intended and configured for use in public areas, such as public bathrooms, public toilets, airports, train stations, petrol stations, restaurants, etc.

The waste bin is configured to sort waste paper products, in particular, waste paper sheet products, e.g., paper towels, from other types of waste, e.g., plastic waste, such as plastic cups, plastic packaging material, plastic bags, plastic bottles or the like, food waste and further types of waste, such as panty liners, cigarette boxes, snuff boxes, sanitary napkins, diapers or the like.

The control may be configured to control the physical property sensing mechanism.

Herein, the term "direct communication" defines that, at least in a direct communication area, no element or component is present between the sorting space and the waste compartment. Thus, communication occurs directly between the sorting space and the waste compartment, without an intermediate element or component being arranged therebetween. The direct communication area may be the entire area between the sorting space and the waste compartment.

Herein, the term "indirect communication" defines that communication between the sorting space and the waste compartment occurs indirectly, i.e., through an intermediate element which is present between the sorting space and the waste compartment. This intermediate element is the movable separation element. Communication between the sorting space and the waste compartment occurs through the plurality of openings of the movable separation element.

The at least one deposit opening is in communication, e.g., direction communication, with the sorting space. Hence, waste deposited in the deposit opening by a user is received in the sorting space. The sorting space is configured to sort waste paper products from other types of waste, i.e., to sort the waste received therein so as to collect waste paper products in the waste paper product compartment and other types of waste in the waste compartment. The control is configured to control the movable separation element and the removal element so that this sorting process is performed.

Specifically, the control is configured to operate the removal element so as to move waste from the sorting space to the waste paper product compartment or to operate the movable separation element so as to establish direct communication between the sorting space and the waste compartment, based on a detection result of the physical property sensing mechanism.

If the detection result of the physical property sensing mechanism, detecting a physical property of the waste received in the sorting space, indicates that the waste is a waste paper product, the control operates the removal element so as to move the waste from the sorting space to the waste paper product compartment.

If the detection result of the physical property sensing mechanism indicates that the waste received in the sorting space is another type of waste, the control operates the movable separation element so as to establish direct communication between the sorting space and the waste compartment. Thus, the waste received in the sorting space drops from the sorting space into the waste compartment.

Hence, the waste bin is configured to sort waste paper products from other types of waste without requiring any active contribution by users of the bin.

Further, the movable separation element comprises a plurality of openings, providing indirect communication between the sorting space and the waste compartment through the movable separation element. The openings of the movable separation element allow some types of waste, in particular, waste having a size smaller than waste paper products, such as waste paper sheet products, e.g., paper towels or tissues, to pass therethrough from the sorting space into the waste compartment. Hence, depending on their size, some types of waste other than waste paper products drop from the sorting space into the waste compartment through the openings of the movable separation element. These openings thus provide an additional sorting mechanism.

Waste received in the sorting space which does not pass through the openings of the movable separation element temporarily remains in the sorting space. Based on a detection result of the physical property sensing mechanism, the control operates the removal element so as to move the waste remaining in the sorting space to the waste paper product compartment or operates the movable separation element so as to establish direct communication between the sorting space and the waste compartment, allowing the waste remaining in the sorting space to drop into the waste compartment.

Moreover, the movable separation element is configured to move upon the application of an external force exceeding a threshold value, thereby establishing direct communication between the sorting space and the waste compartment. Therefore, if waste having a weight of more than a predetermined value, exerting a gravitational force exceeding the threshold value, is received in the sorting space, the movable separation element is moved so that direct communication between the sorting space and the waste compartment is established. Due to this direct communication, the waste falls from the sorting space into the waste compartment. In particular, depending on their weight, some types of waste other than waste paper products cause the movable separation element to move and thus drop into the waste compartment. Hence, the movable arrangement of the movable separation element provides a further additional sorting mechanism.

Waste received in the sorting space which does not, due to its weight, cause the movable separation element to move temporarily remains in the sorting space. Based on a detection result of the physical property sensing mechanism, the control operates the removal element so as to move the waste remaining in the sorting space to the waste paper product compartment or operates the movable separation element so as to establish direct communication between the sorting space and the waste compartment, allowing the waste remaining in the sorting space to drop into the waste compartment.

In the waste bin of the present disclosure, waste paper products are thus sorted or separated from other types of waste on the basis of different sorting criteria, namely the size of the waste, the weight of the waste and the physical property of the waste, thereby achieving a high degree of accuracy in the sorting process. Hence, the waste bin allows for waste paper products to be sorted from other types of waste in an efficient and reliable manner.

The waste bin may be configured so that the time for performing the sorting or separation process in the waste bin, i.e., the time period from depositing the waste in the deposit opening to receiving the waste in the waste paper product compartment or the waste compartment, is 5 seconds or less, preferably 4 seconds or less, more preferably 3 seconds or less, even more preferably 2 seconds or less, and yet even more preferably 1 second or less.

The waste bin may further comprise a motor for moving the movable separation element. The movable separation element may be operated to move, so as to establish direct communication between the sorting space and the waste compartment, by means of the motor.

The waste paper products may be waste paper sheet products, such as paper towels, tissues, napkins or the like. For this type of waste paper products, the waste bin of the present disclosure can be used in a particularly beneficial manner. In particular, the movable separation element, the physical property sensing mechanism, the removal element and the control of the waste bin allow for waste paper sheet products to be sorted or separated from other types of waste with an especially high degree of accuracy.

The waste bin may be used particularly advantageously for collecting waste paper sheet products, such as paper towels, tissues, napkins or the like, and other types of waste in public areas, such as public bathrooms, public toilets, airports, train stations, petrol stations, restaurants, etc.

The waste bin may further comprise a movement sensing mechanism for detecting movement of the movable separation element. The control may be configured to operate the removal element so as to move waste from the sorting space to the waste paper product compartment or to operate the movable separation element so as to establish direct communication between the sorting space and the waste compartment, based on detection results of the physical property sensing mechanism and the movement sensing mechanism.

If waste received in the sorting space through the deposit opening causes movement of the movable separation element, e.g., by dropping onto the movable separation element, this movement is detected by the movement sensing mechanism. The nature and the amount of the movement depend on various properties of the waste received in the sorting space, such as its weight, its size, its density, its hardness and its shape. Hence, the detection result of the movement sensing mechanism yields an indication of the properties of the waste received in the sorting space.

For example, a comparatively hard but lightweight waste object may not cause a significant linear movement of the movable separation element but, by falling onto the movable separation element, may generate a vibration or oscillation thereof, i.e., an impact vibration or oscillation. Such a vibration or oscillation can be detected by the movement sensing mechanism.

If the detection result of the movement sensing mechanism indicates that the waste received in the sorting space is a waste paper product, such as a waste paper sheet product, the control operates the removal element so as to move the waste from the sorting space to the waste paper product compartment.

If the detection result of the movement sensing mechanism indicates that the waste received in the sorting space is another type of waste, the control operates the movable separation element so as to establish direct communication between the sorting space and the waste compartment. Thus, the waste received in the sorting space drops from the sorting space into the waste compartment.

The movement sensing mechanism thus provides an additional sorting mechanism, further enhancing the accuracy of the sorting process. Hence, waste paper products can be sorted from other types of waste in a particularly efficient and reliable manner.

The control may be configured to control the movement sensing mechanism.

The movement sensing mechanism may be a vibration sensor for detecting vibrations imparted to the movable separation element by waste received in the sorting space. Due to their comparatively low density and/or hardness, waste paper products, such as waste paper sheet products, generally do not impart significant vibrations to the movable separation element. The use of a vibration sensor as the movement sensing mechanism thus enables especially reliable separation of waste paper products, such as waste paper sheet products, from other types of waste, in particular, from other types of waste with a high density and/or a high degree of hardness.

The vibration sensor may comprise or be a piezoelectric sensor.

The physical property of the waste detected by the physical property sensing mechanism may be an optical property of the waste, such as the colour and/or the size and/or the transparency and/or the reflectivity and/or the absorptivity of the waste, an acoustic property of the waste, such as the acoustic transparency and/or the acoustic reflectivity and/or the acoustic absorptivity of the waste, an electrical property of the waste, such as the electrical conductivity and/or the electrical resistivity of the waste, a thermal property of the waste, such as the thermal conductivity and/or the thermal resistivity of the waste, or a different physical property of the waste.

The physical property sensing mechanism may be an acoustic sensor for detecting an acoustic property of waste received in the sorting space, such as the acoustic transparency and/or the acoustic reflectivity and/or the acoustic absorptivity of the waste. The acoustic sensor may comprise an element for emitting an acoustic wave, such as a speaker or the like, and an element for receiving a transmitted acoustic wave and/or a reflected acoustic wave, i.e., an acoustic wave transmitted through the waste and/or an acoustic wave reflected from the waste, such as a microphone or the like. Waste paper products, such as waste paper sheet products, generally have acoustic properties which are considerably different from those of other types of waste, such as plastic waste, metal waste, glass waste or the like.

The physical property sensing mechanism may be an electrical property sensor for detecting an electrical property of waste received in the sorting space, such as the electrical conductivity and/or the electrical resistivity of the waste. The electrical property sensor may comprise an element for measuring the electrical conductivity and/or conductance of the waste and/or an element for measuring the electrical resistivity and/or resistance of the waste, such as an ohmmeter. Waste paper products, such as waste paper sheet products, generally have electrical properties which are considerably different from those of other types of waste, in particular, types of waste comprising or consisting of a conductive material or conductive materials, such as metal waste.

For example, the physical property sensing mechanism may be configured to measure the electrical conductivity and/or conductance of the movable separation element and/or to measure the electrical resistivity and/or resistance of the movable separation element. If waste comprising or consisting of a conductive material or conductive materials, such as a metal foil, is received on the movable separation element, bridging at least one or some of the openings of the movable separation element, this will result in a change of these electrical properties of the movable separation element which can be detected by the physical property sensing mechanism.

The physical property sensing mechanism may be a thermal sensor for detecting a thermal property of waste received in the sorting space, such as the thermal conductivity and/or the thermal resistivity of the waste. The thermal sensor may comprise an element for measuring the thermal conductivity and/or conductance of the waste, such as a thermal conductance tester, and/or an element for measuring the thermal resistivity and/or resistance of the waste, such as a thermal resistance tester. Waste paper products, such as waste paper sheet products, generally have thermal properties which are considerably different from those of other types of waste, such as plastic waste, metal waste, glass waste or the like.

The physical property sensing mechanism may be an optical sensor for detecting an optical property of waste received in the sorting space, such as the colour and/or the size and/or the transparency and/or the reflectivity and/or the absorptivity of the waste. Waste paper products, such as waste paper sheet products, generally have optical properties which are considerably different from those of other types of waste, such as plastic waste, metal waste, glass waste or the like. For example, waste paper products commonly have a comparatively low level of transparency and/or a comparatively low level of reflectivity and/or a comparatively high level of absorptivity.

The use of an optical sensor as the physical property sensing mechanism thus enables especially reliable separation of waste paper products, such as waste paper sheet products, from other types of waste, in particular, from other types of waste with a comparatively high level of transparency and/or a comparatively high level of reflectivity and/or a comparatively low level of absorptivity.

Further, the optical sensor may be configured to monitor the sorting space at irregular or regular intervals, e.g., at regular intervals of 0.8 seconds or less, intervals of 0.5 seconds or less, intervals of 0.2 seconds or less, or intervals of 0.1 seconds or less, in order to determine whether waste is present in the sorting space. If the presence of waste in the sorting space is detected, the control may operate the removal element so as to move the waste from the sorting space to the waste paper product compartment or operate the movable separation element so as to establish direct communication between the sorting space and the waste compartment, based on a detection result or detection results of the physical property sensing mechanism and/or the movement sensing mechanism. In this way, it can be particularly securely avoided that waste remains in the sorting space for an extended period of time.

The optical sensor may comprise or be a camera, such as a digital camera. The camera may be configured to take an image or images of the waste received in the sorting space. Further, the camera and/or another element of the optical sensor, such as an image analysis element, may be configured to analyse the image or images in order to detect an optical property of the waste.

The movable separation element may be movable from a first position, in which it separates the sorting space from the waste compartment, to a second position, in which direct communication between the sorting space and the waste compartment is established. The first position is an at least substantially closed position. The second position is an at least partially open position. The movable separation element may be biased towards the first position. In this case, the threshold value to be overcome by an external force in order to move the movable separation element may be defined by the biasing force biasing the movable separation element towards the first position. Thus, the threshold value can be controlled in a particularly accurate and simple manner. Further, after the waste received in the sorting space has dropped into the waste compartment, the movable separation element returns to its original position, i.e., the first position, due to the biasing force exerted thereon.

The waste bin may further comprise a biasing member, such as a spring member, wherein the movable separation element is biased towards the first position by the biasing member, such as the spring member. The use of a spring member, such as a coil spring or the like, provides an especially simple configuration of the biasing member.

The openings of the movable separation element may have a predetermined size, allowing waste having a size smaller than the predetermined size to pass therethrough from the sorting space into the waste compartment. The predetermined size may be smaller than a size of the at least one deposit opening.

The openings of the movable separation element may have a size in the range of 1 mm to 50 mm, preferably 2 mm to 40 mm, more preferably 5 mm to 30 mm, even more preferably 8 mm to 20 mm, and yet even more preferably 10 mm to 15 mm.

The movable separation element may comprise a plurality of fingers. In particular, the movable separation element may comprise two or more fingers, three or more fingers, four or more fingers, five or more fingers, or six or more fingers. For example, the movable separation element may comprise 3 to 20 fingers, 5 to 18 fingers, 8 to 15 fingers or 10 to 12 fingers. The openings of the movable separation element may be elongate openings or gaps provided between the fingers.

The fingers are elongate elements extending substantially in parallel to each other along a longitudinal direction of the fingers. The fingers may have a substantially straight shape or a curved or bent shape. For example, the fingers may be bent towards the removal element.

The fingers of the movable separation element are configured to temporarily retain waste paper products, in particular, waste paper sheet products, in the sorting space, while other types of waste having a size smaller than waste paper products, such as waste paper sheet products, are allowed to pass from the sorting space through the elongate openings or gaps between the fingers into the waste compartment.

The width, in the direction substantially perpendicular to the longitudinal direction of the fingers, of the elongate openings or gaps between the fingers may be in the range of 1 mm to 50 mm, preferably 2 mm to 40 mm, more preferably 5 mm to 30 mm, even more preferably 8 mm to 20 mm, and yet even more preferably 10 mm to 15 mm.

The waste bin may further comprise a cleaning member for removing waste from the openings of the movable separation element. The cleaning member may have a plurality of pushing elements. Each pushing element may be configured for being inserted into a corresponding opening of the movable separation element, thereby pushing out waste from the respective opening. In this way, it can be ensured that the openings of the movable separation element are not blocked by waste material, so that a high degree of accuracy in the sorting or separation process can be reliably maintained over an extended period of time.

The cleaning member and the movable separation element may be configured to be movable relative to each other. The cleaning member may be arranged in a stationary manner and the movable separation element may be configured to be movable relative to the cleaning member.

Relative movement between the cleaning member and the movable separation element may cause the pushing elements of the cleaning member to be inserted into the corresponding openings of the movable separation element.

For example, the cleaning member and the movable separation element may be configured so that movement of the movable separation element, establishing direct communication between the sorting space and the waste compartment, also causes the pushing elements of the cleaning member to be inserted into the corresponding openings of the movable separation element.

The control may be configured to operate the cleaning member so as to insert the pushing elements into the corresponding openings of the movable separation element.

In addition or as an alternative to the cleaning member, the removal element may be configured for cleaning the movable separation element.

The removal element may comprise or be a rotating member. The removal element may be configured to move waste from the sorting space to the waste paper product compartment by rotating the rotating member.

In particular, the removal element may be configured to move waste from the sorting space to the waste paper product compartment by rotating the rotating member by half a turn, i.e., a rotation by 180°, or more, by a full turn, i.e., a rotation by 360°, or more, by one and a half turns or more, by two turns or more, or by three turns or more. The removal element may be configured to move waste from the sorting space to the waste paper product compartment by rotating the rotating member by three turns or less, by two turns or less, by one and a half turns or less, or by one turn or less.

A smaller number of turns offers an especially fast sorting or separation process. A larger number of turns allows for waste to be moved from the sorting space to the waste paper product compartment with a particularly high degree of reliability.

The removal element may comprise or be a brush and/or a flexible curtain and/or a rigid plate and/or an air nozzle. For example, the removal element may comprise or be a brush and/or a flexible curtain and/or a rigid plate which is configured as a rotating member for moving waste from the sorting space to the waste paper product compartment by rotating the rotating member. The removal element may comprise or be an air nozzle configured to move waste from the sorting space to the waste paper product compartment by ejecting or blowing air at the waste received in the sorting space.

The waste bin may further comprise a position sensing mechanism for detecting the position of the movable separation element.

The control may be configured to control the position sensing mechanism.

The control may be configured to operate the movable separation element so as to establish direct communication between the sorting space and the waste compartment, based on a detection result of the position sensing mechanism.

In particular, the force exerted on the movable separation element by waste received in the sorting space may cause movement of the movable separation element but the direct communication established between the sorting space and the waste compartment by this movement may not be sufficient for allowing the waste to drop into the waste compartment, e.g., due to the size and/or shape of the waste. In this case, the movable separation element is moved away from its original position, i.e., the first, at least substantially closed position, due to the weight of the waste resting thereon. This change in position is detected by the position sensing mechanism.

If the detection result of the position sensing mechanism indicates such a change in the position of the movable separation element, the control operates the movable separation element so as to establish further direct communication between the sorting space and the waste compartment, i.e., so as to increase the direct communication area, allowing the waste received in the sorting space to drop into the waste compartment.

In this way, the efficiency and the reliability of the sorting process can be yet further enhanced.

The waste bin may comprise a single deposit opening. In this way, a particular space saving arrangement of the waste bin can be achieved.

Alternatively, the waste bin may further comprise another deposit opening. The other deposit opening may be in communication, e.g., in direct communication, with the waste compartment.

In this case, the one deposit opening is configured and intended for waste paper products and the other deposit opening is configured and intended for other types of waste. Thus, the amount of waste of other types deposited in the one deposit opening is significantly reduced. Hence, the movable separation element and the removal element have to be operated less frequently. In this way, the wear of the movable parts of the waste bin is reduced, allowing for the service life of the waste bin to be extended. If other types of waste are deposited in the one deposit opening by mistake, they are efficiently and reliably moved to the waste compartment by the sorting functionality of the waste bin.

The waste bin may comprise a compressing means for compressing waste received in the waste paper product compartment and/or the waste compartment. By using such a compressing means, the waste received in the waste paper product compartment and/or the waste compartment can be compacted, thereby increasing the capacity of the waste paper product compartment and/or the waste compartment for storing waste. Thus, the waste bin has to be emptied less frequently.

In particular, waste paper products, such as waste paper sheet products, generally have a comparatively low density and can be compressed to a significant degree. Hence, especially the storage capacity of the waste paper product compartment can be significantly enhanced by the compressing means.

The compressing means may comprise or be a compressing plate. The compressing plate may be movable in a vertical direction of the waste bin, i.e., in the direction of gravity. The vertical direction of the waste bin is the direction from the one deposit opening towards the sorting space. By moving the compressing plate downwards in the vertical direction of the waste bin, the waste received in the waste paper product compartment and/or the waste compartment is compressed.

The compressing plate may be rotatable from a first position, in which a plane of the compressing plate is substantially parallel to a vertical direction of the waste bin, to a second position, in which the plane of the compressing plate is substantially perpendicular to the vertical direction of the waste bin.

In the second position, the compressing plate can compress the waste received in the waste paper product compartment and/or the waste compartment in a particularly efficient and reliable manner, namely by moving the compressing plate downwards in the vertical direction of the waste bin. In the first position, due to the upright arrangement of the compressing plate, it can be reliably ensured that the compressing plate does not block the waste paper product compartment and/or the waste compartment. Hence, a high degree of reliability and accuracy in the sorting process can be maintained.

The compressing means may comprise or be a single compressing plate. The compressing plate may be configured to compress waste received in the waste paper product compartment and/or the waste compartment. For example, the compressing plate may be movable in a lateral direction perpendicular to the vertical direction of the waste bin. By moving the compressing plate in the lateral direction, the compressing plate may be arranged for compressing waste received in the waste paper product compartment in one compressing step and be arranged for compressing waste received in the waste compartment in another compressing step.

The compressing means may comprise or consist of two compressing plates. One of the two compressing plates may be configured to compress waste received in the waste paper product compartment. The other of the two compressing plates may be configured to compress waste received in the waste compartment.

The removal element may be configured so as to also serve as the compressing means. For example, the removal element may comprise or be a rotating member, wherein the removal element is configured to move waste from the sorting space to the waste paper product compartment by rotating the rotating member. Further, the rotating member may have a substantially planar or plate-like shape. The rotating member may be rotatable to a position in which the plane of the rotating member is substantially perpendicular to the vertical direction of the waste bin. In this position, the rotating member may compress the waste received in the waste paper product compartment and/or the waste compartment by moving the rotating member downwards in the vertical direction of the waste bin.

The rotating member may be movable in the lateral direction. By laterally moving the rotating member, the rotating member may be arranged in a position for moving waste from the sorting space to the waste paper product compartment, and in a position for compressing waste received in the waste paper product compartment and/or in a position for compressing waste received in the waste compartment.

The waste compartment may be arranged, entirely or partially, underneath the sorting space in the vertical direction of the waste bin. In this way, it can be particularly reliably ensured that other types of waste received in the sorting space are efficiently moved to the waste compartment.

Moreover, it is desired to provide a method which enables efficient and reliable sorting of waste paper products from other types of waste in a waste bin. This object can be achieved by a method with the technical features given in the following.

The method of the present disclosure is a method of sorting waste paper products from other types of waste in a waste bin, such as the waste bin of the present disclosure. The waste bin comprises a sorting space, a waste paper product compartment for receiving and storing waste paper products, a waste compartment for receiving and storing other types of waste, a movable separation element separating the sorting space from the waste compartment, and a removal element for moving waste from the sorting space to the waste paper product compartment. The movable separation element comprises a plurality of openings, providing indirect communication between the sorting space and the waste compartment through the movable separation element. The method comprises a physical property detection step of detecting a physical property of waste received in the sorting space, and operating the removal element so as to move waste from the sorting space to the waste paper product compartment or operating the movable separation element so as to establish direct communication between the sorting space and the waste compartment, based on a detection result of the physical property detection step.

The method of the present disclosure is a method of sorting waste paper products from other types of waste in a waste bin such as the waste bin of the present disclosure. Hence, the technical advantages described above for the waste bin of the present disclosure also apply to the method of the present disclosure. Moreover, the features disclosed in connection with the above description of the waste bin of the present disclosure may also be applied to the method of the present disclosure.

The method may further comprise a movement detection step of detecting movement of the movable separation element. The removal element may be operated so as to move waste from the sorting space to the waste paper product compartment or the movable separation element may be operated so as to establish direct communication between the sorting space and the waste compartment, based on detection results of the physical property detection step and the movement detection step.

The method may further comprise a cleaning step of removing waste from the openings of the movable separation element. The cleaning step may be performed by using a cleaning member, such as the cleaning member detailed above.

The method may further comprise a position detection step of detecting the position of the movable separation element. The movable separation element may be operated so as to establish direct communication between the sorting space and the waste compartment, based on a detection result of the position detection step. The position detection step may be performed by using a position sensing mechanism, such as the position sensing mechanism detailed above.

The method may further comprise one or more compressing steps of compressing waste received in the waste paper product compartment and/or the waste compartment. The one or more compressing steps may be performed by using a compressing means, such as the compressing means detailed above.

BRIEF DESCRIPTION OF THE DRAWINGS

For a better understanding of the present disclosure and to show how the same may be carried into effect, reference will now be made, by way of example only, to the accompanying drawings, in which.

DETAILED DESCRIPTION OF THE INVENTION

Particular embodiments of the present disclosure will now be described with reference to the accompanying drawings.

Figure 1:
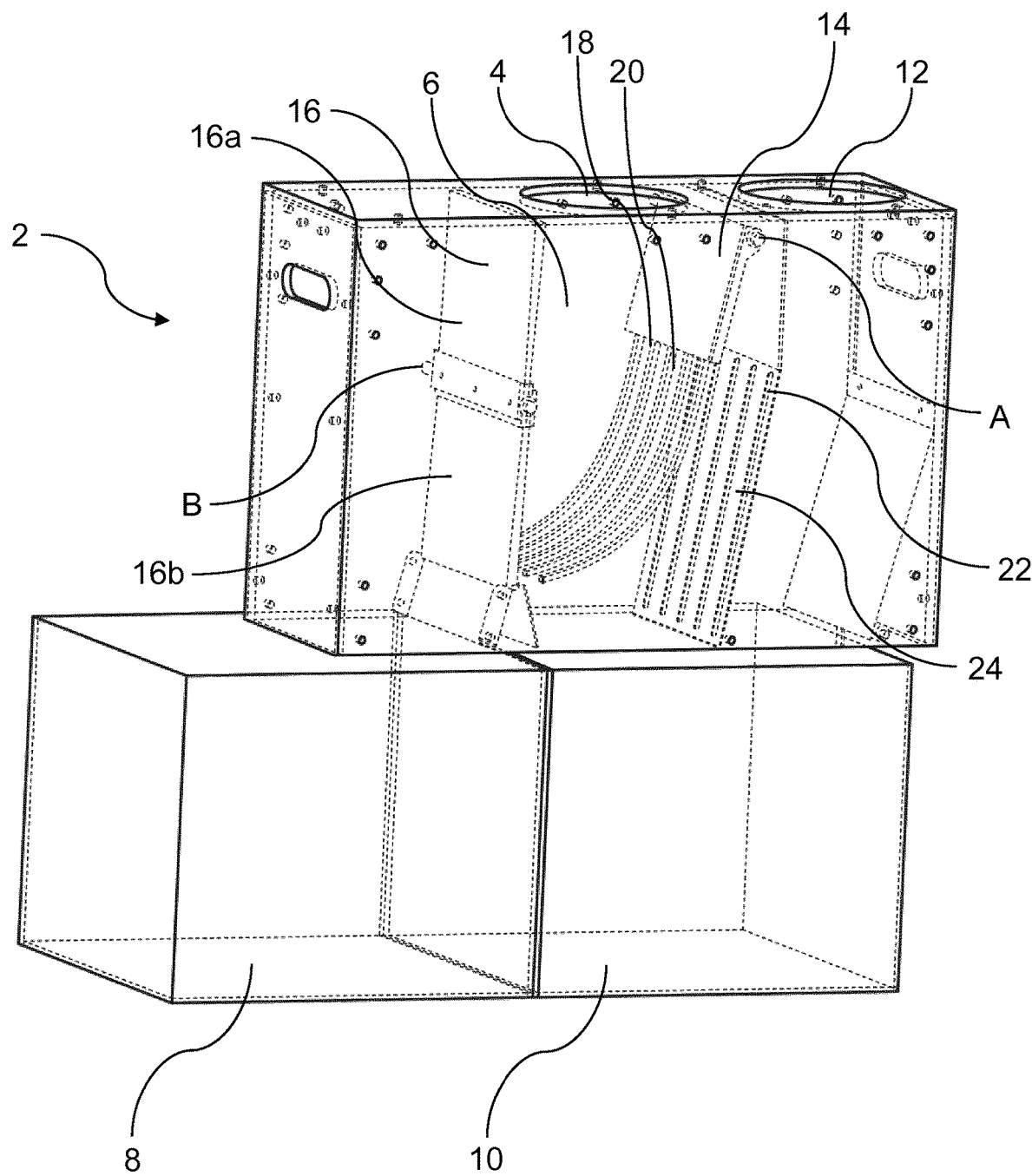
FIG. 1 shows a schematic perspective transparent view of a waste bin according to an embodiment of the present disclosure.

FIG. 1 shows a schematic perspective transparent view of a waste bin 2 according to an embodiment of the present disclosure.

The waste bin 2 is a waste bin for waste paper products and other types of waste. In particular, the waste bin 2 is configured to sort waste paper products, such as waste paper sheet products, e.g., paper towels, tissues, napkins or the like, from other types of waste, e.g., plastic waste, such as plastic cups, plastic packaging material, plastic bags, plastic bottles or the like, food waste and further types of waste, such as panty liners, cigarette boxes, snuff boxes, sanitary napkins, diapers or the like.

The waste bin 2 is intended and configured for use in public areas, such as public bathrooms, public toilets, airports, train stations, petrol stations, restaurants, etc.

The waste bin 2 comprises a first deposit opening 4 for depositing waste paper products into an interior of the waste bin 2 and a sorting space 6 for sorting waste paper products from other types of waste. The first deposit opening 4 is in direct communication with the sorting space 6.

Further, the waste bin 2 comprises a waste paper product compartment 8 for receiving and storing waste paper products, a waste compartment 10 for receiving and storing other types of waste, and a second deposit opening 12. The waste compartment 10 is arranged underneath the sorting space 6 in a vertical direction of the waste bin 2. The second deposit opening 12 is in direct communication with the waste compartment 10. The first deposit opening 4 is configured and intended for waste paper products and the second deposit opening 12 is configured and intended for other types of waste. If other types of waste are deposited in the first deposit opening 4 by mistake, they are efficiently and reliably moved to the waste compartment 10 by the sorting functionality of the waste bin 2, as will be detailed below.

The waste bin 2 further comprises a movable separation element 14 separating the sorting space 6 from the waste compartment 10, a physical property sensing mechanism (not shown) for detecting a physical property of waste received in the sorting space 6, a removal element 16 for moving waste from the sorting space 6 to the waste paper product compartment 8, and a control (not shown) for controlling the movable separation element 14 and the removal element 16.

The control may be any type of control, e.g., a control unit, a control element, a control circuit or the like. The control may comprise or be a processor, such as a CPU.

The movable separation element 14 comprises five fingers 18. The fingers 18 have a curved or bent shape. Specifically, as is shown in FIG. 1, the fingers 18 are curved or bent towards the removal element 16.

The movable separation element 14 is provided in an inclined arrangement with respect to the vertical direction of the waste bin 2 (see FIG. 1). In particular, the movable separation element 14 is inclined in such a manner that waste falling onto the movable separation element 14 from the first deposit opening 4 is guided towards the removal element 16.

Four elongate openings 20, i.e., gaps, are provided in the movable separation element 14 between the fingers 18. The openings 20 provide indirect communication between the sorting space 6 and the waste compartment 10 through the movable separation element 14. The width, in the direction substantially perpendicular to the longitudinal direction of the fingers 18, of the openings 20 may be in the range of 5 mm to 40 mm.

In FIG. 1, the movable separation element 14 is shown in its substantially closed position in which it separates the sorting space 6 from the waste compartment 10. Only indirect communication occurs between the sorting space 6 and the waste compartment 10 through the openings 20 of the movable separation element 14.

The fingers 18 of the movable separation element 14 are configured to temporarily retain waste paper products, in particular, waste paper sheet products, in the sorting space 6, while other types of waste having a size smaller than waste paper products are allowed to pass from the sorting space 6 through the openings 20 between the fingers 18 into the waste compartment 10.

The movable separation element 14 is configured to move upon the application of an external force exceeding a threshold value, thereby establishing direct communication between the sorting space 6 and the waste compartment 10. Specifically, the movable separation element 14 is configured so as to be rotatable around an axis A (see FIG. 1). If an external force exceeding the threshold value is applied to the movable separation element 14 by waste received in the sorting space 6, the movable separation element 14 is rotated around the axis A in the counterclockwise direction, so as to allow direct communication between the sorting space 6 and the waste compartment 10.

The movable separation element 14 is biased towards the substantially closed position shown in FIG. 1 by a biasing member, namely a spring member (not shown). The spring member may be, for example, a torsion spring. Thus, the threshold value to be overcome by an external force in order to move the movable separation element 14 is defined by the biasing force of the spring member. After the waste received in the sorting space 16 has dropped into the waste compartment 10, the movable separation element 14 returns to its original position, i.e., the substantially closed position, due to the biasing force exerted by the spring member.

The removal element 16 is configured as a rotating member, in particular, a planar or plate-like rotating member. Specifically, the removal element 16 is arranged so as to be rotatable around an axis B (see FIG. 1). The removal element 16 is configured as a brush unit comprising a first brush member 16a and a second brush member 16b.

The removal element 16 is configured to move waste from the sorting space 6 to the waste paper product compartment 8 by rotating the removal element 16. For this purpose, the removal element 16 may be rotated by half a turn or more, as will be further detailed below.

In FIG. 1, the removal element 16 is shown in its initial or default position. In this position, the plane of the removal element 16 is arranged so as to be substantially parallel to the vertical direction of the waste bin 2. As is shown in FIG. 1, in this position, the sorting space 6 is separated from the waste paper product compartment 8 by the removal element 16. Hence, it can be reliably ensured that waste received in the sorting space 6 through the first deposit opening 4 is temporarily maintained in the sorting space 6, allowing for the physical property of the waste to be detected by the physical property sensing mechanism. Only when the removal element 16 is operated so as to move the waste from the sorting space 6 to the waste paper product compartment 8, communication, i.e., direct communication, between the sorting space 6 and the waste paper product compartment 8 is established.

If the removal element 16 is rotated by half a turn in the clockwise direction from the initial or default position shown in FIG. 1, the first brush member 16a moves over the movable separation element 14, thereby moving waste received in the sorting space 6 to the waste paper product compartment 8. If the removal element 16 is rotated by a full turn, the first and second brush members 16a, 16b consecutively move over the movable separation element 14, improving the waste removal efficiency. The waste removal efficiency can be further enhanced by rotating the removal element 16 by more than one turn.

After the waste received in the sorting space 6 has been moved to the waste paper product compartment 8, the removal element 16 is returned to its initial or default position, i.e., the position shown in FIG. 1.

In the present embodiment, the physical property sensing mechanism is an optical sensor for detecting an optical property of waste received in the sorting space 6, such as the colour and/or the size and/or the transparency and/or the reflectivity and/or the absorptivity of the waste. Specifically, the physical property sensing mechanism is a digital camera which is configured to take an image or images of the waste received in the sorting space 6. Further, the digital camera is configured to analyse the image or images in order to detect the optical property of the waste.

The digital camera may be configured to monitor the sorting space 6, i.e., take an image or images of the sorting space 6, e.g., at irregular or regular intervals, for example, at regular intervals of 0.5 seconds or less, in order to determine whether waste is present in the sorting space 6. If the presence of waste in the sorting space 6 is detected by the digital camera, the control may operate the removal element 16 so as to move the waste from the sorting space 6 to the waste paper product compartment 8 or operate the movable separation element 14 so as to establish direct communication between the sorting space 6 and the waste compartment 10, based on detection results of the physical property sensing mechanism and a movement sensing mechanism (detailed below). In this way, it can be particularly securely avoided that waste remains in the sorting space 6 for an extended period of time.

The waste bin 2 further comprises a movement sensing mechanism (not shown) for detecting movement of the movable separation element 14. Specifically, the movement sensing mechanism is a vibration sensor, namely a piezoelectric vibration sensor, for detecting vibrations imparted to the movable separation element 14 by waste received in the sorting space 6.

The control of the waste bin 2 is configured to operate the removal element 16 so as to move waste from the sorting space 6 to the waste paper product compartment 8 or to operate the movable separation element 14 so as to establish direct communication between the sorting space 6 and the waste compartment 10, based on detection results of the physical property sensing mechanism and the movement sensing mechanism.

The waste bin 2 further comprises a position sensing mechanism (not shown) for detecting the position of the movable separation element 14.

The control of the waste bin 2 is configured to operate the movable separation element 14 so as to establish direct communication between the sorting space 6 and the waste compartment 10, based on a detection result of the position sensing mechanism.

In particular, the force exerted on the movable separation element 14 by waste received in the sorting space 6 from the first deposit opening 4 may cause movement of the movable separation element 14. However, the direct communication established between the sorting space 6 and the waste compartment 10 by this movement may not be sufficient for allowing the waste to drop into the waste compartment 10, e.g., due to the size and/or shape of the waste. In this case, the movable separation element 14 is moved away from the at least substantially closed position shown in FIG. 1, due to the weight of the waste resting thereon. This change in position is detected by the position sensing mechanism. Thus, the control operates the movable separation element 14 so as to establish further direct communication between the sorting space 6 and the waste compartment 10, allowing the waste received in the sorting space 6 to drop into the waste compartment 10.

The waste bin 2 further comprises a motor (not shown) for moving the movable separation element 14. The movable separation element 14 is operated to move, so as to establish direct communication between the sorting space 6 and the waste compartment 10, by means of the motor.

Moreover, the waste bin 2 comprises a cleaning member 22 for removing waste from the openings 20 of the movable separation element 14. The cleaning member 22 is configured as a plate having a plurality of slits. The portions of the plate arranged between these slits act as pushing elements 24 which are arranged for being inserted into corresponding openings 20 of the movable separation element 14, thereby pushing out waste from the openings 20.

The cleaning member 22 is arranged in a stationary manner, i.e., in a fixed position with respect to the remainder of the waste bin 2. The movable separation element 14 is configured to be movable relative to the cleaning member 22, i.e., rotatable around the axis A. Rotation of the movable separation element 14 around the axis A in the counterclockwise direction causes the pushing elements 24 of the cleaning member 22 to be inserted into the corresponding openings 20 of the movable separation element 14. The fingers 18 of the movable separation element 14 are inserted into the slits of the plate-shaped cleaning member 22. In this way, it can be ensured that the openings 20 of the movable separation element 14 are not blocked by waste material.

Moreover, although this is not shown in FIG. 1, the waste bin 2 may further comprise a compressing means (not shown) for compressing waste received in the waste paper product compartment 8 and/or the waste compartment 10, such as the compressing means detailed above.

In the following, a method of sorting waste paper products from other types of waste in the waste bin 2 according to an embodiment of the present disclosure will be described with reference to FIGS. 1 and 2.

Figure 2:
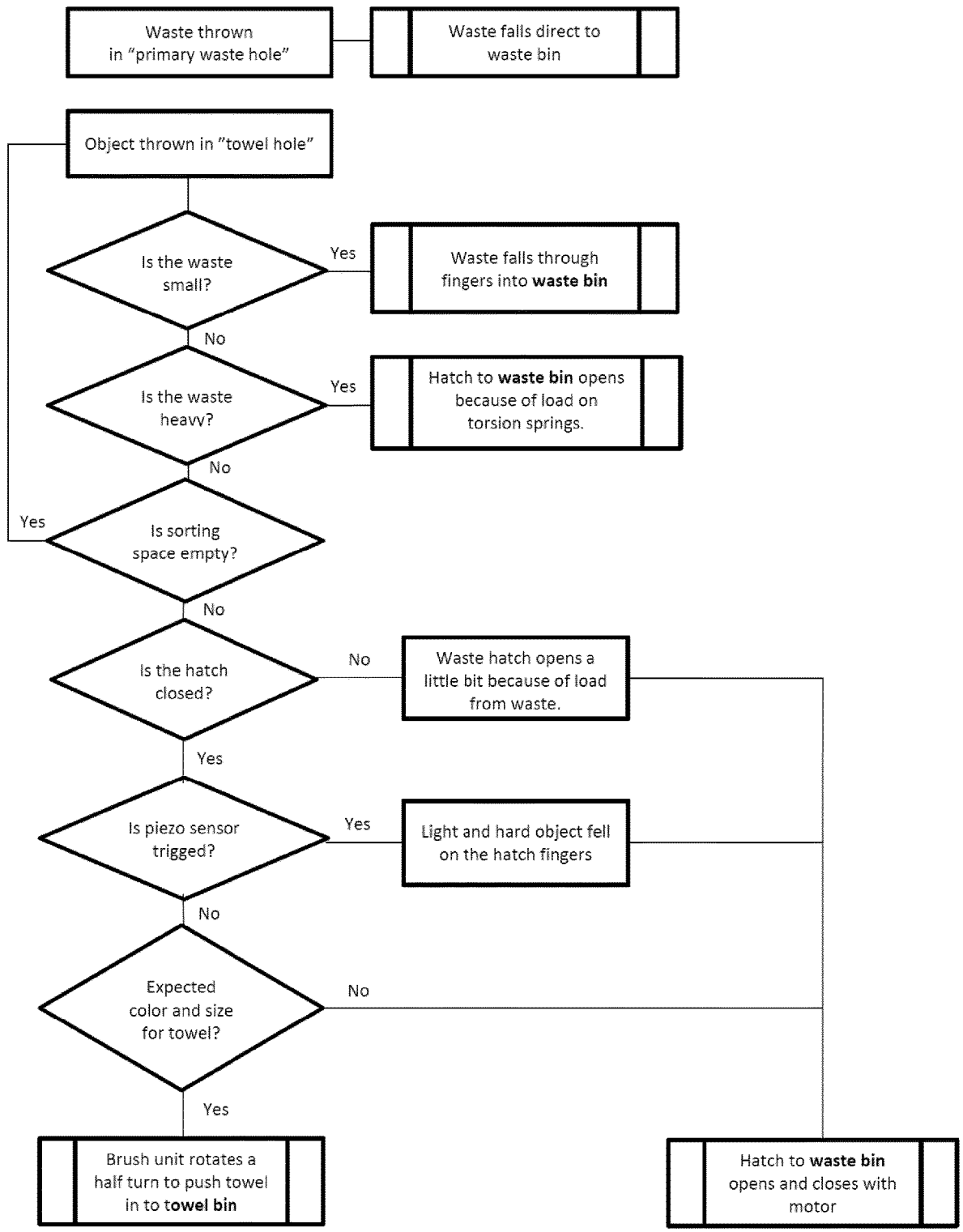
FIG. 2 shows a block diagram of a method of sorting waste paper products from other types of waste in the waste bin shown in FIG. 1 according to an embodiment of the present disclosure.

In the exemplary embodiment of the method shown in FIG. 2, the first deposit opening 4 is referred to as "towel hole", i.e., as a hole for paper towels, the second deposit opening 12 is referred to as "primary waste hole", the waste paper product compartment 8 is referred to as "towel bin", the waste compartment 10 is referred to as "waste bin", the movable separation element 14 is referred to as "hatch", and the movement sensing mechanism is referred to as "piezo sensor".

If waste is thrown into the second deposit opening 12, the waste falls directly into the waste compartment 10. Waste thrown into the first deposit opening 4 is received in the sorting space 6.

If the size of the waste received in the sorting space 6 is smaller than the size of the openings 20 of the movable separation element 14, the waste passes through the openings 20 and drops into the waste compartment 10. In this way, waste objects with a small size, in particular, a smaller size than common waste paper products, are sorted or separated and stored in the waste compartment 10. Hence, the openings 20 of the movable separation element 14 provide a first sorting mechanism of the waste bin 2.

If the weight of the waste received in the sorting space 6 exceeds a predetermined value, thus overcoming the biasing force of the spring member, the movable separation element 14 is moved, i.e., rotated around the axis A, so that direct communication between the sorting space 6 and the waste compartment 10 is established. Due to this direct communication, the waste falls from the sorting space 6 into the waste compartment 10. In particular, depending on their weight, some types of waste other than waste paper products cause the movable separation element 14 to move and thus drop into the waste compartment 10. Hence, the movable arrangement of the movable separation element 14 provides a second sorting mechanism of the waste bin 2.

The sorting space 6 is monitored by the digital camera. If the monitoring result provided by the digital camera indicates that the sorting space 6 is empty, no further measures are taken. If the monitoring result provided by the digital camera indicates that waste is present in the sorting space 6, the further procedure depends on the detection result of the position sensing mechanism.

If the detection result of the position sensing mechanism indicates that the movable separation element 14 has been moved away from its initial, at least substantially closed position, i.e., the position shown in FIG. 1, the control operates the movable separation element 14 so as to establish further direct communication between the sorting space 6 and the waste compartment 10, allowing the waste received in the sorting space 6 to drop into the waste compartment 10. Subsequently, the movable separation element 14 is operated by the control so as to return to the at least substantially closed position.

If the detection result of the position sensing mechanism indicates that the movable separation element 14 is in its at least substantially closed position, the further procedure depends on the detection result of the movement sensing mechanism, i.e., the piezoelectric vibration sensor. The position sensing mechanism thus provides a third sorting mechanism of the waste bin 2.

If the detection result of the piezoelectric vibration sensor indicates that vibrations have been imparted to the movable separation element 14 by the waste received in the sorting space 6, the control operates the movable separation element 14 so as to establish direct communication between the sorting space 6 and the waste compartment 10, allowing the waste received in the sorting space 6 to drop into the waste compartment 10. Subsequently, the movable separation element 14 is operated by the control so as to return to the at least substantially closed position.

If the detection result of the piezoelectric vibration sensor indicates that no vibrations have been imparted to the movable separation element 14 by the waste received in the sorting space 6, the further procedure depends on the detection result of the optical property of the waste provided by the digital camera. The piezoelectric vibration sensor thus provides a fourth sorting mechanism of the waste bin 2.

The digital camera is configured to take an image or images of the waste received in the sorting space 6 and to analyse the image or images in order to detect the optical property of the waste, as has been detailed above. The optical property of the waste may be, for example, the colour and the size of the waste (see FIG. 2).

If the detection result of the digital camera indicates that the waste received in the sorting space 6 is a waste paper product, in particular, a waste paper sheet product, such as a paper towel, the control operates the removal element 16, i.e., the brush unit, so as to move the waste from the sorting space 6 to the waste paper product compartment 8. Specifically, for this purpose, the removal element 16 may be rotated by half a turn, as has been detailed above.

If the detection result of the digital camera indicates that the waste received in the sorting space 6 is another type of waste, the control operates the movable separation element 14 so as to establish direct communication between the sorting space 6 and the waste compartment 10. Thus, the waste received in the sorting space 6 drops from the sorting space 6 into the waste compartment 10. Subsequently, the movable separation element 14 is operated by the control so as to return to the at least substantially closed position. The digital camera thus provides a fifth sorting mechanism of the waste bin 2.

The time for performing the sorting or separation process in the waste bin 2, i.e., the time period from depositing the waste in the first deposit opening 4 to receiving the waste in the waste paper product compartment 8 or the waste compartment 10, is 4 seconds or less, preferably 1 second or less.

The waste bin 2 and the method of the present embodiments allow for waste paper products to be sorted or separated from other types of waste on the basis of various different sorting criteria, thereby achieving a high degree of accuracy in the sorting process. Hence, the waste bin 2 and the method enable the sorting of waste in an efficient and reliable manner, without requiring any active contribution by users of the waste bin 2.

While the present invention has been illustrated by description of various embodiments and while those embodiments have been described in considerable detail, it is not the intention of Applicants to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicants' invention.

What is claimed is:

1. A waste bin for waste paper products and other types of waste, the waste bin comprising:
    at least one deposit opening configured for depositing waste into an interior of the waste bin;
    a sorting space configured for sorting waste paper products from other types of waste, wherein the at least one deposit opening is in communication with the sorting space;
    a waste paper product compartment configured for receiving and storing waste paper products;
    a waste compartment configured for receiving and storing other types of waste;
    a movable separation element separating the sorting space from the waste compartment;
    a physical property sensing mechanism configured for detecting a physical property of waste received in the sorting space;
    a removal element configured for moving waste from the sorting space to the waste paper product compartment; and
    a control configured for controlling the movable separation element and the removal element,
    wherein the movable separation element comprises a plurality of openings, providing indirect communication between the sorting space and the waste compartment through the movable separation element,
    the movable separation element is configured to move upon the application of an external force exceeding a threshold value, thereby establishing direct communication between the sorting space and the waste compartment, and
    the control is configured to operate the removal element so as to move waste from the sorting space to the waste paper product compartment or to operate the movable separation element so as to establish direct communication between the sorting space and the waste compartment, based on a detection result of the physical property sensing mechanism.

2. The waste bin according to claim 1, wherein the waste paper products are waste paper sheet products, such as paper towels.

3. The waste bin according to claim 1, further comprising a movement sensing mechanism configured for detecting movement of the movable separation element, wherein the control is configured to operate the removal element so as to move waste from the sorting space to the waste paper product compartment or to operate the movable separation element so as to establish direct communication between the sorting space and the waste compartment, based on detection results of the physical property sensing mechanism and the movement sensing mechanism.

4. The waste bin according to claim 3, wherein the movement sensing mechanism is a vibration sensor configured for detecting vibrations imparted to the movable separation element by waste received in the sorting space.

5. The waste bin according to claim 1, wherein the physical property sensing mechanism is an optical sensor configured for detecting an optical property of waste received in the sorting space.

6. The waste bin according to claim 1, wherein the movable separation element is movable from a first position, in which it separates the sorting space from the waste compartment, to a second position, in which direct communication between the sorting space and the waste compartment is established, and the movable separation element is biased towards the first position.

7. The waste bin according to claim 6, further comprising a spring member, wherein the movable separation element is biased towards the first position by the spring member.

8. The waste bin according to claim 1, wherein the openings of the movable separation element have a predetermined size, allowing waste having a size smaller than the predetermined size to pass therethrough from the sorting space into the waste compartment, and the predetermined size is smaller than a size of the at least one deposit opening.

9. The waste bin according to claim 1, wherein the movable separation element comprises a plurality of fingers and the openings of the movable separation element are elongate openings provided between the fingers.

10. The waste bin according to claim 1, further comprising a cleaning member configured for removing waste from the openings of the movable separation element, wherein the cleaning member has a plurality of pushing elements, each pushing element being configured for being inserted into a corresponding opening of the movable separation element, thereby pushing out waste from the respective opening.

11. The waste bin according to claim 1, wherein the removal element comprises a rotating member and the removal element is configured to move waste from the sorting space to the waste paper product compartment by rotating the rotating member.

12. The waste bin according to claim 1, wherein the removal element comprises a brush and/or a flexible curtain and/or a rigid plate and/or an air nozzle.

13. The waste bin according to claim 1, further comprising a position sensing mechanism configured for detecting the position of the movable separation element.

14. The waste bin according to claim 13, wherein the control is configured to operate the movable separation element so as to establish direct communication between the sorting space and the waste compartment, based on a detection result of the position sensing mechanism.

15. The waste bin according to claim 1, further comprising another deposit opening which is in communication with the waste compartment.

16. The waste bin according to claim 1, further comprising a compressing means configured for compressing waste received in the waste paper product compartment and/or the waste compartment.

17. The waste bin according to claim 16, wherein the compressing means comprises a compressing plate, the compressing plate being movable in a vertical direction of the waste bin.

18. The waste bin according to claim 17, wherein the compressing plate is rotatable from a first position, in which a plane of the compressing plate is substantially parallel to a vertical direction of the waste bin, to a second position, in which the plane of the compressing plate is substantially perpendicular to the vertical direction of the waste bin.

19. The waste bin according to claim 16,
wherein the compressing means comprises a single compressing plate, the compressing plate being configured to compress waste received in the waste paper product compartment and/or the waste compartment, or
the compressing means comprises two compressing plates, one of the two compressing plates being configured to compress waste received in the waste paper product compartment, and the other of the two compressing plates being configured to compress waste received in the waste compartment.

20. The waste bin according to claim 16, wherein the removal element also serves as the compressing means.

21. The waste bin according to claim 1, wherein the waste compartment is arranged underneath the sorting space in a vertical direction of the waste bin.

22. A method of sorting waste paper products from other types of waste in a waste bin, the waste bin comprising:
a sorting space;
a waste paper product compartment configured for receiving and storing waste paper products;
a waste compartment configured for receiving and storing other types of waste;
a movable separation element separating the sorting space from the waste compartment, the movable separation element comprising a plurality of openings, providing indirect communication between the sorting space and the waste compartment through the movable separation element; and
a removal element configured for moving waste from the sorting space to the waste paper product compartment;
wherein the method comprises:
a physical property detection step of detecting a physical property of waste received in the sorting space, and
operating the removal element so as to move waste from the sorting space to the waste paper product compartment or operating the movable separation element so as to establish direct communication between the sorting space and the waste compartment, based on a detection result of the physical property detection step.

23. The method according to claim 22, further comprising:
a movement detection step of detecting movement of the movable separation element,
wherein the removal element is operated so as to move waste from the sorting space to the waste paper product compartment or the movable separation element is operated so as to establish direct communication between the sorting space and the waste compartment, based on detection results of the physical property detection step and the movement detection step.

24. The waste bin according to claim 4, wherein the vibration sensor is a piezoelectric sensor.

25. The waste bin according to claim 5, wherein the optical sensor is a digital camera.

* * * * *